United States Patent [19]
Alvesteffer et al.

[11] Patent Number: 6,125,695
[45] Date of Patent: *Oct. 3, 2000

[54] METHOD AND APPARATUS FOR MEASURING A FLUID

[75] Inventors: William J. Alvesteffer, Newport News; Yufeng Huang, Chesapeake; Larry Eget, Newport News, all of Va.

[73] Assignee: Teledyne Brown Engineering, Inc., Hunstville, Ala.

[*] Notice: This patent issued on a continued prosecution application filed under 37 CFR 1.53(d), and is subject to the twenty year patent term provisions of 35 U.S.C. 154(a)(2).

[21] Appl. No.: 08/949,249

[22] Filed: Oct. 13, 1997

[51] Int. Cl.$^7$ .................................................... G01F 1/68
[52] U.S. Cl. .................................................... 73/204.27
[58] Field of Search .......................... 73/204.22, 204.27, 73/202, 204.26, 862.68, 204.15, 204.12; 364/509; 123/494

[56] References Cited

U.S. PATENT DOCUMENTS

| | | | |
|---|---|---|---|
| 4,118,779 | 10/1978 | Tanei et al. ............................... | 364/509 |
| 4,464,932 | 8/1984 | Ewing et al. . | |
| 4,548,075 | 10/1985 | Mariano .................................... | 73/202 |
| 4,566,320 | 1/1986 | Bohrer . | |
| 4,651,564 | 3/1987 | Johnson et al. . | |
| 4,815,280 | 3/1989 | Tujimura et al. ..................... | 73/204.12 |
| 4,888,988 | 12/1989 | Lee et al. ............................... | 73/204.26 |
| 4,930,349 | 6/1990 | Takahashi et al. ....................... | 73/497 |
| 4,984,460 | 1/1991 | Isoda . | |
| 5,060,527 | 10/1991 | Burgess ................................. | 73/862.68 |
| 5,142,907 | 9/1992 | Hinkle . | |
| 5,161,410 | 11/1992 | Davey et al. . | |
| 5,171,793 | 12/1992 | Drexel et al. ......................... | 73/204.22 |
| 5,309,762 | 5/1994 | Satoh et al. .......................... | 73/204.22 |
| 5,398,549 | 3/1995 | Suzuki . | |
| 5,410,912 | 5/1995 | Suzuki ................................. | 73/204.15 |
| 5,454,259 | 10/1995 | Ishii et al. ............................... | 73/118.1 |
| 5,461,913 | 10/1995 | Hinkle et al. . | |
| 5,596,969 | 1/1997 | Lopinski ................................ | 123/494 |

*Primary Examiner*—Benjamin R. Fuller
*Assistant Examiner*—Jewel V. Thompson
*Attorney, Agent, or Firm*—R. J. Pugh; P. J. Viccaro

[57] ABSTRACT

A flow sensor including a symmetrical sensor tube for carrying the fluid, first and second heaters symmetrically disposed at the sensor tube, and a first temperature sensor in thermal communication with the fluid. A flow meter including a flow sensor having a sensor tube, a first heater disposed at the sensor tube, a second heater disposed at the sensor tube, and a first temperature sensor in thermal communication with the fluid. The meter also includes a circuit for selectively applying power to the first and second heaters to maintain a temperature difference between a temperature of the first and second heaters and the temperature of the fluid, and for determining a difference in power supplied to the first and second heaters. A method including providing first and second heaters at a temperature a fixed amount above a temperature of the fluid; determining a difference in power supplied to the first and second heaters; and determining a measurement of the fluid from the difference in power supplied to the first and second heaters.

48 Claims, 7 Drawing Sheets

METHOD AND APPARATUS FOR MEASURING A FLUID

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention is directed generally to a method and apparatus for measuring a fluid and, more particularly, for measuring a fluid by maintaining first and second heaters at a constant temperature and measuring relative power consumption of the heaters.

2. Description of the Background

Flow sensors and meters are used to determine the fluid flow of a known fluid. One type of prior art device measures fluid flow by volumetric means, wherein the volume of fluid passing a point in a known time is used to calculate flow rate. However, because the volume of a given mass of a fluid changes with fluid pressure and temperature, volumetric measurements may not be accurate. For example, an increase in the internal pressure of the fluid system will cause the volume occupied by a given number of fluid molecules to decrease. That decrease in volume will cause an error in readings of mass flow rate by a volumetric method.

Other prior art devices, known as heat transfer mass flow rate sensors, measure fluid flow by mass, not volume, so as to be unaffected by changes in fluid temperature and pressure. Such sensors include means for heating the fluid as it passes through a sensor tube and means of detecting the rate at which the heat applied to the fluid is carried away by the fluid flowing through the sensor tube.

Different designs have been utilized to heat a sensor tube of heat transfer mass flow rate sensors. Early designs inductively heated the sensor tube with constant power. Later designs employed a resistor temperature heating device powered by a constant voltage or a constant current. Other designs heated the sensor tube with a high resistance winding to which was applied a constant power.

Prior art heat transfer mass flow rate sensors have a number of drawbacks. For example, they are slow to respond to sudden fluid flow rate changes. This is because increased fluid flow also increases the amount of heat carried away from the sensor tube, cooling down the sensor tube. Thus, the temperature of the sensor tubes of prior art sensors will be a function of the flow rate through them. Typically, a passive temperature change can be modeled as a decaying exponential, and due to the mass of the sensor tube the time constant for prior art sensors is on the order of a second. Normally, it takes several time constants for temperature shifts to come to equilibrium. Therefore, the prior art sensors will tend to be slow to respond to sudden changes of fluid flow. Moreover, many prior art sensors will have a non-linearity problem because the reduction in sensor tube temperature with increasing mass flow will result in a decreasing sensitivity to further increases in mass flow. Thus, many prior art sensors cannot measure more than about 10 $cm^3$/minute of fluid at atmospheric pressure without becoming too nonlinear to properly calibrate.

Prior art sensors also suffer from thermal drift problems because they measure the temperature of the sensor tube before and after the heater device, such as with thermocouples, resistor temperature devices (RTD), or thermistors. The output from those sensors assumes that the differential temperature between the inlet and outlet temperature detectors is proportional to the mass flow rate. However, this is only strictly true when the sensor operates at the temperature at which it was calibrated.

Some prior art heat transfer mass flow rate sensors provide some type of first order correction to this sensing error by changing the drive power with temperature or by incorporating a temperature-sensitive gain stage in the output amplifiers. Other sensors includes sensor tube heaters that are designed to operate at a constant temperature regardless of the magnitude of fluid flow. Such sensors may not have the slow response to flow rate changes discussed above, but as the ambient air temperature increases the differential temperature and signal output decreases.

Other prior art sensors are designed so that the ambient temperature around the sensor is maintained at a constant temperature that is above the maximum expected ambient operating temperature, while also heating the sensor tube to another higher temperature. Such sensors may satisfactorily treat both response time and temperature difference variation problems, but are mechanically very complex and require significant power to raise the ambient temperature surrounding the sensor tube to a temperature above the maximum expected operating temperature. Such constant temperature sensors also suffer an additional deficiency. Typically, a mass flow sensor measures the flow rate of a small percentage of a much larger fluid flow. The measured portion of the flow is split off from the main fluid flow by a laminar flow element bypass unit. Constant temperature sensors produce a temperature dependent flow split error between the sensor and the flow bypass. The flow split error occurs because the fluid in the sensor tube is maintained at a constant temperature that gives it a constant viscosity, while variations in the ambient temperature produce viscosity variations in the flow bypass fluid. Thus, constant temperature sensors may treat one source of error, but introduce another source of error.

Certain early heat transfer mass flow rate sensors utilize the same RTDs to heat the fluid flow and to measure the fluid flow temperature. All such sensors use the voltage across the bridge as the sensor output, which introduces a non-linearity in the output versus flow.

Accordingly, a need exists for a cost effective apparatus and method to accurately measure fluid flow under a wide variety of operating conditions.

BRIEF SUMMARY OF THE INVENTION

The present invention is directed to a sensor for sensing a fluid. The sensor includes a symmetrical sensor tube for carrying the fluid, first and second heaters symmetrically disposed at the sensor tube, and a first temperature sensor in thermal communication with the fluid.

The present invention is also directed to a meter for measuring a fluid having a temperature. The meter includes a flow sensor having a sensor tube, a first heater disposed at the sensor tube, a second heater disposed at the sensor tube, and a first temperature sensor in thermal communication with the fluid. The meter also includes a circuit for selectively applying power to the first and second heaters to provide the first and second heaters at a temperature a fixed amount above the temperature of the fluid, and for determining a difference in power supplied to the first and second heaters.

Furthermore, the present invention is directed to a method of determining a measurement a fluid. The method includes providing first and second heaters at a temperature a fixed amount above the temperature of the fluid; determining a difference in power supplied to the first and second heaters; and determining a measurement of the fluid from the difference in power supplied to the first and second heaters.

The present invention may be used in many applications, including semiconductor manufacturing devices, chemical laboratory devices, fluid handling devices, medical devices, and environmental sampling devices.

The present invention solves problems the prior art because it is inexpensive to manufacture and operate and because it offers improved performance characteristics. Those and other advantages and benefits of the present invention will become apparent from the description of the preferred embodiments hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

Figure 1:
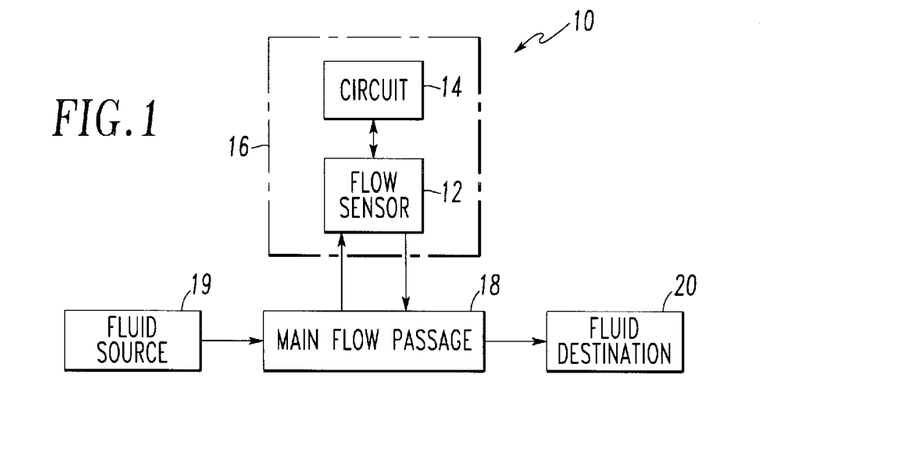
FIG. 1 is a block diagram of a system having a flow sensor in parallel with a main flow passage and constructed in accordance with the present invention.

FIG. 1 is a block diagram of a fluid system 10 constructed in accordance with the present invention. The system 10 includes a flow sensor 12 and a circuit 14 forming a flow meter 16 for measuring a known fluid, such as liquids and gasses. The flow meter 16 may measure the flow rate and the mass flow rate of a known fluid. The fluid flows through a main flow passage 18 from a fluid source 19 to a fluid destination 20. The flow sensor 12 may be connected in parallel with the flow passage 18 and a constant ratio of fluid diverted from the flow passage 18 to the flow sensor 12. The mass flow through the flow sensor 12 may be determined by the circuit 14, and total mass flow of the fluid may be determined from the fluid through the sensor 12 and the ratio of diverted fluid to total fluid.

Figure 2:
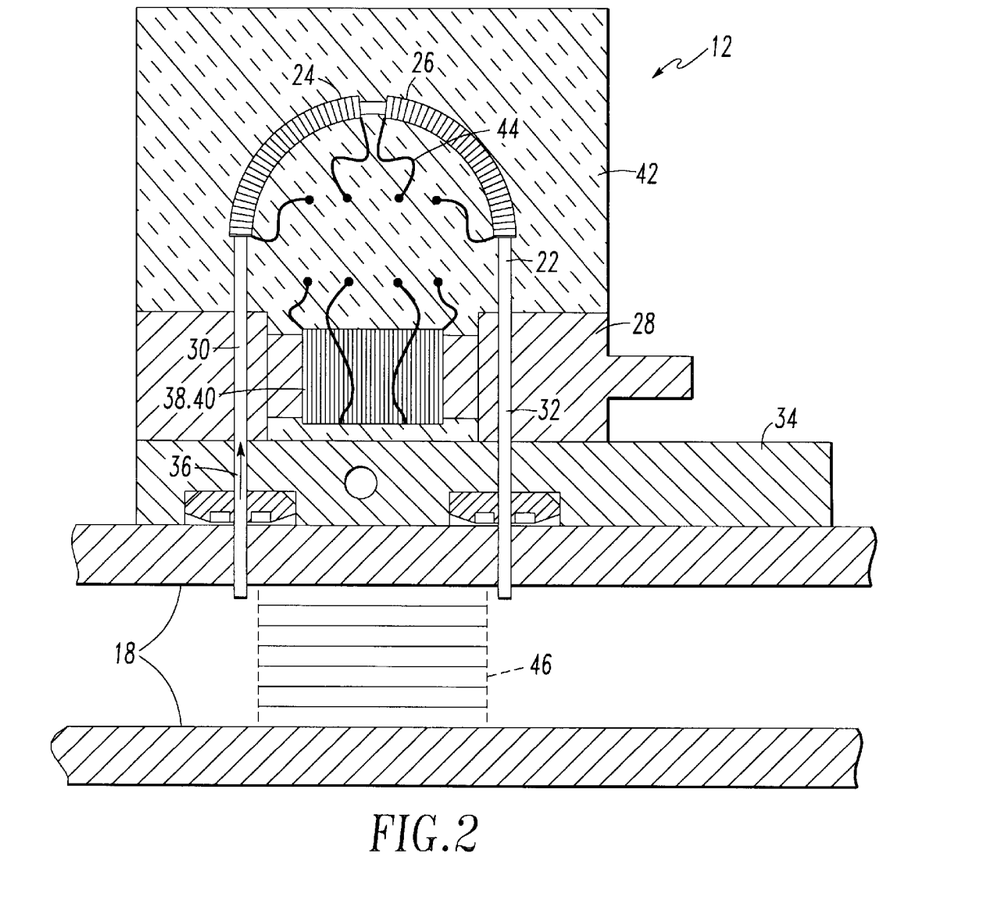
FIG. 2 is a partial cross-sectional view of the flow sensor illustrated in FIG. 1.

FIG. 2 is a cross-sectional view of the flow sensor 12 illustrated in FIG. 1. The flow sensor 12 is tolerant of temperature and pressure fluctuations in the fluid. The flow sensor 12 may be constructed from many materials and in many dimensions. The materials and dimensions provided herein are illustrative and are not the only manner of embodying the present invention.

The flow sensor 12 includes a sensor tube 22 through which flows fluids to be measured. The sensor tube 22 may be constructed from stainless steel, may be circular in cross-section, may have an inner diameter of 0.26 inches, and may have a length of three inches. As discussed hereinbelow, superior results may be obtained if the sensor tube 22 has a symmetrical shape. The sensor tube 22 illustrated in FIG. 2 has an upside-down "U" shape and is symmetrical about a vertical axis.

Figure 2A:
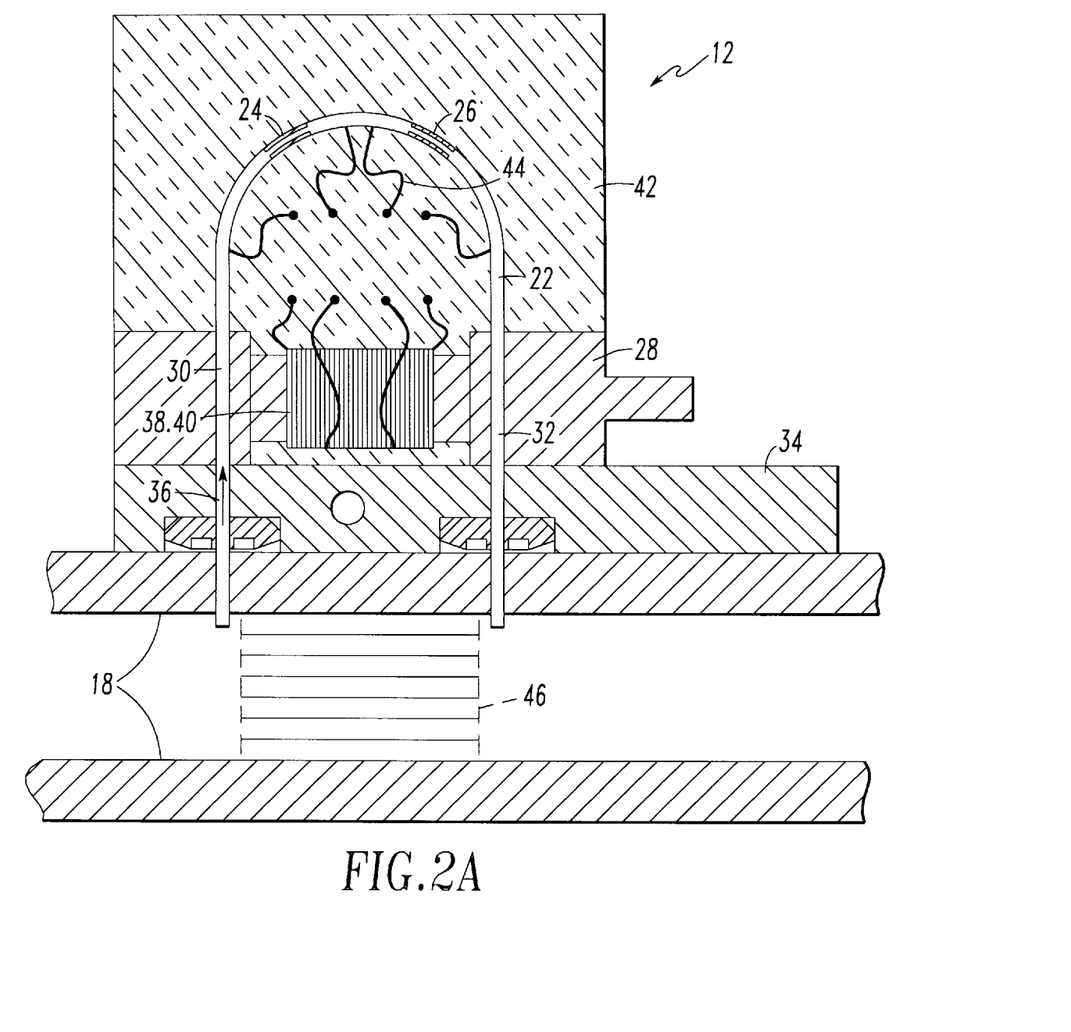
FIG. 2A is a partial cross-sectional view of a flow sensor according to another embodiment of the present invention.

First and second heaters 24, 26 are disposed at the sensor tube 22. The heaters 24, 26 may be disposed symmetrically about the sensor tube 12 to realize advantages described in more detail hereinbelow. In FIG. 2 the heaters 24, 26 are symmetrical about a vertical axis. The heaters 24, 26 may be formed from wire wrapped or coiled around the sensor tube 12. The characteristics and specifications of the wire forming the heaters may be varied to suit different applications. The wire for both heaters 24, 26 may be taken from a single batch of wire to improve consistency between the heaters 24, 26. The wire may have a temperature coefficient of resistance between approximately three thousand (3000) ppm and five thousand (5000) ppm. In a preferred embodiment, the wire has a temperature coefficient of resistance of approximately three thousand five hundred (3500) ppm. The significance of the wire's temperature coefficient of resistance is discussed in more detail hereinbelow. The heaters 24, 26 may take other forms, such as thin film elements formed on either the outside or the inside of the sensor tube 22. If the heaters 24, 26 are formed on the inside of the sensor tube 22, such as illustrated in FIG. 2A, they are preferably coated with a protective, non-reactive material, such as silicon nitride, to prevent a chemical reaction with the fluid in the sensor tube 22. Furthermore, heaters 24, 26 on the inside of the sensor tube 22 are preferably non-invasive to reduce disruption to fluid flow through the sensor tube 22. The heaters 24, 26 may be made non-invasive by being thin and/or by being recessed within the wall of the sensor tube 22.

An ambient temperature block 28 is in thermal communication with the fluid, such as by being in contact with the main flow passage 18. The ambient temperature block 28 is constructed from a material, such as aluminum, that has sufficient thermal conductivity to be indicative of the temperature of the fluid in the main flow passage 18. The ambient temperature block 28 may also be in thermal communication with a portion 30 of the sensor tube 22 upstream from the heaters 24, 26 and with a portion 32 of the sensor tube 22 downstream from the heaters 24, 26, so as to maintain the temperature of the fluid in the sensor tube 22 at the same temperature as the fluid in the main flow passage 28.

A sensor base 34 may be provided in thermal communication with the ambient temperature block 28 and may provide a platform on which to mount the ambient temperature block 28 to the main flow passage 18. The sensor base 34 may be constructed from stainless steel and may thermally connect the ambient temperature block 28 to the main flow passage 18. Thermally conductive materials 36, such as thermally conductive grease and thermally conductive gel, may be placed between the sensor tube 22, the ambient temperature block 28, and the sensor base 32 to fill voids and improve thermal conductivity.

First and second ambient fluid temperature sensors 38, 40 are in thermal communication with the fluid in the flow passage 18, such as by being in contact with the ambient temperature block 28. The sensors 38, 40 may be formed from wire wrapped or coiled around the ambient temperature block 28. The sensors 38, 40 may be formed from the same batch of wire used for the first and second heaters 24, 26 so as to facilitate consistent characteristics, such as resistivity and temperature coefficient of resistance. Alternatively, the temperature sensors 38, 40 may be located on either the outside of the main flow passage 18 or the inside of the main flow passage 18. If the temperature sensors 38, 40 are located on the inside of the flow passage 18, they are preferably coated with a protective, non-reactive material, such as silicon nitride, to prevent a chemical reaction with the fluid in the flow passage 18. Furthermore, temperature sensors 38, 40 on the inside of the flow passage 18 are preferably non-invasive to reduce disruption to fluid flow. The sensors 38, 40 may be made non-invasive by being thin and/or by being recessed within the wall of the flow passage 18. Also, the temperature sensors 38, 40 may be formed from other than wire, such as thin film elements, thermocouples, resistor temperature devices, and thermistors. Two temperature sensors 38, 40 are illustrated in FIG. 2. However, more or less temperature sensors may be used with the present invention.

Thermal insulation 42, such as closed cell foam, may be placed around the sensor tube 22, heaters 24, 26, and temperature sensors 38, 40, to reduce movement of air and thermal convection. Wires 34 from various elements, such as the first and second heaters 24, 26 and the first and second ambient temperature sensors 38, 40, may be routed through the thermal insulation 42 to the circuit 14, illustrated in FIG. 1.

A laminar flow element 46 may be in the main flow passage 18 between the inlet and outlet of the sensor tube 22. The laminar flow element 46 may be made up of a several passages and generates a pressure drop to force fluid to flow through the sensor tube 22.

In operation, both heaters 24, 26 are maintained at a temperature $(T_h)$ that is a fixed temperature difference above the ambient temperature $(T_a)$ of the fluid in the main flow passage 18. The power dissipation of the heaters 24, 26 may be expressed as $Q_c + Q_a + Q_f$, where $Q_c$ is heat conduction down the sensor tube 22, $Q_a$ is heat conduction to the air, and $Q_f$ is the heat loss or gain from the fluid flow within sensor tube 22. Fluid flows through the sensor tube 22 in a direction indicated by arrow 36. At low fluid flow rates, the flowing fluid removes heat from the upstream end of the sensor tube 22 and returns it to downstream end. At such flow rates, the heat conduction $(Q_{f1})$ away from the first heater 24 is equal in magnitude to heat conduction into the second heater 26 $(Q_{f2})$, but with an opposite direction of conduction, such that:

$$Q_{f1} = -Q_{f2}.$$

In the embodiment illustrated in FIG. 2, the sensor tube 22 is symmetrical and the heaters 24, 26 are symmetrical about the sensor tube 22 so that the tube conduction $(Q_c)$ and air conduction $(Q_a)$ terms will be approximately equal for each of the heaters 24, 26. If the sensor tube 22 and/or the heaters are asymmetric, the present invention may use a correction factor to correct for unequal tube conduction $Q_c$ and air conduction $Q_a$.

The power supplied to each of the heaters 24, 26 may be referred to as $P_1$ for the first heater 24 and $P_2$ for the second heater 26. The difference in power $(P_1 - P_2)$ required to maintain $T_h$ in the heaters 24, 26 may be expressed as:

$$(P_1 - P_2) = (Q_{c1} + Q_{a1} + Q_{f1}) - (Q_{c2} + Q_{a2} - Q_{f2}),$$

which reduces to:

$$(P_1 - P_2) = 2 \ast Q_{f1} = -2 \ast Q_{f2}.$$

The heat transfer by the fluid flow in the sensor tube 22 is proportional to the mass flow rate $(\dot{m})$ of the fluid passing through the sensor tube 22, the difference between the temperature $(T_h)$ of the heaters 24, 26 and the temperature $(T_g)$ of the fluid, and the constant pressure specific heat $(C_p)$ of the fluid. That heat transfer may be expressed as:

$$Q_f = \dot{m} \ast C_p \ast (T_h - T_a).$$

For most simple fluids, the constant pressure specific heat $C_p$ is substantially constant over small temperature variations. The present invention holds the temperature difference $T_h - T_g$ approximately constant. Because, as shown above, the heat transfer of the fluid flow is equal to one-half (½) of the difference between the power supplied to each of the heaters 24, 26, the heat transfer by the fluid flow may be expressed as:

$$Q_f = (P_1 - P_2)/2 = \dot{m} \ast C_p \ast (T_h - T_a),$$

and therefore the mass flow rate may be expressed as:

$$\dot{m} = (P_1 - P_2)/(2 \ast C_p \ast (T_h - T_a)),$$

where the denominator will be a known constant for a known fluid when the temperature of the fluid undergoes only small variations, as may be realized with the present invention. Thus, the mass of the fluid may be determined once the power difference term $(P_1 - P_2)$ is known. The power to the first heater 24 and the power to the second heater 26 can be determined by measuring the current (I) and voltage (V) supplied to the heaters 24, 26, where $P = I \ast V$. Once the mass flow rate $(\dot{m})$ of the fluid is known, the mass of the fluid may be determined from the time elapsed (t) during measurement of the mass flow. Thus, the mass is equal to a gain constant (G) multiplied by the heat transfer of the fluid stream multiplied by the elapsed time, as follows:

$$m = (P_1 - P_2) \ast t/(2 \ast C_p \ast (T_h - T_a)) = G \ast Q_{f1},$$

where:

$$Q_{f1} = (P_1 - P_2)/2, \text{ and}$$

$$G = t/(C_p \ast (T_h - T_a)).$$

The circuit 14, illustrated in FIG. 1, may use analog multiplication circuits and/or digital processors to determine the power supplied to the first and second heaters 24, 26, determine the difference in power values, and determined the mass flow of the fluid.

The sensor 12 offers a number of advantages over the prior art. For example, the symmetrical sensor tube 22 reduces or eliminates errors due to fluctuations in temperature because the sensor tube 22 does not cool down with increased fluid flow. As a result, linear output for flow rates of 50 cc/minute have been achieved with the present invention. In addition, because the heaters 24, 26 do not change temperature with varying flow rates, signal response in the present invention is improved, achieving time constants on the order of 100 milliseconds. Furthermore, because the increased mass flow does not change the temperature of the sensor 12, larger masses can be measured without sacrificing response speed. As a result, the sensor 12 may utilize larger sensor tubes 22 than was possible with prior art devices. Larger sensor tubes 22 allow the differential pressure across the sensor 22 to be lowered, thereby decreasing cycle times during leak checks. A larger diameter sensor tube 22 also makes the sensor 12 less sensitive to calibration shifts due to contamination from a dirty fluid supply.

Figure 3:
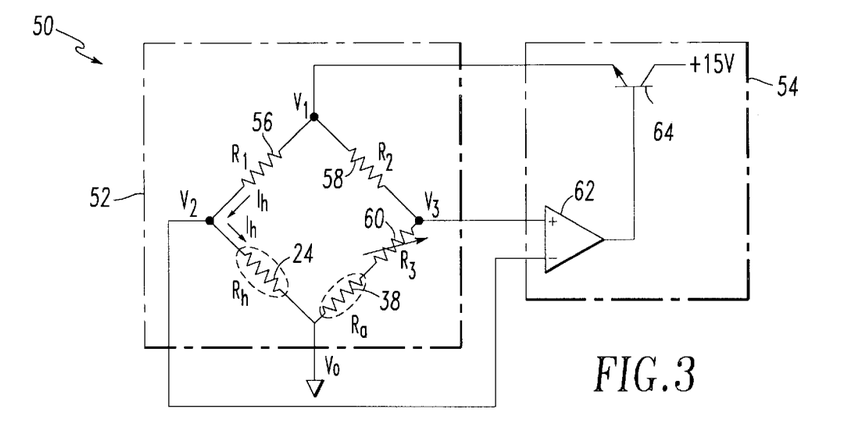
FIG. 3 is a schematic of a circuit that may be used with the flow sensor illustrated in FIG. 2.

FIG. 3 is a schematic of a circuit 50 that may form part of the circuit 14 used with the flow sensor 12 illustrated in FIG. 2. The circuit 50 includes a Wheatstone bridge 52 and a power controller 54. The circuit 50 controls the first heater 24 in the flow sensor 12. Another circuit, constructed and operated in a manner analogous to the circuit 50 illustrated in FIG. 3, may be used to control the second heater 26.

The Wheatstone bridge 52 includes the first heater 24 in series with a first resistor 56 on one side of the bridge to form a voltage divider. The other side of the bridge has a second resistor 58 in series with an adjustable resistor 60 and the first ambient temperature sensor 38 to form another voltage divider. $V_0$ is a common voltage at the bottom of the bridge, $V_1$ is a voltage at the top of the bridge controlled by the power controller 54, $V_2$ is a voltage between the first resistor 56 and the first heater 24, and $V_3$ is a voltage between the second resistor 58 and the adjustable resistor 60.

The first heater 24, the first ambient temperature sensor 38, and the first and second resistors 56, 58 may be selected so that the ratio of the first resistor 56 to the second resistor 58 and the ratio of the first heater 24 to the ambient temperature sensor 38 are approximately equal. In one embodiment, the ratio is one to ten, and the resistances are:

$R_h$=400 ohms, $R_a$=4000 ohms, $R_1$=150 ohms, and $R_2$=1500 ohms, so that $R_h/R_a=R_1/R_2=1/10$.

The first heater 24 and the first ambient temperature sensor 38 have resistance values that are a function of temperature and may be expressed as:

$R=R_0*(1+\alpha*(T-T_0))$, wherein $R_0$ is the resistance of the device at a reference temperature $T_0$, and $\alpha$ is a temperature coefficient of resistance (TCR) of the wire forming the heater 24 and the ambient temperature sensor 38.

The power controller 54 includes an operational amplifier 62 and a transistor 64. The operational amplifier 62 has first and second input terminals connected to nodes carrying voltages $V_2$ and $V_3$, respectively, and an output terminal connected to a base of the transistor 64. The power controller 54 senses the relative voltages $V_2$, $V_3$ and adjusts the voltage $V_1$ so that voltages $V_2$, $V_3$ are equal.

In operation, the adjustable resistor 60 may be set such that when voltage is first applied, $V_3$ will be slightly greater than $V_2$. The power controller 54 will increase $V_1$ which will drive more current through the Wheatstone bridge 52, causing $V_2$ and $V_3$ to increase. As a result, power at each of the resistors will increase according to the formula $P=V^2/R$. As a result, the heater 24 will become warmer than the temperature sensor 38 because $R_a$ is approximately ten times $R_h$, and so the heat generated by the temperature sensor 38 will be approximately ten times less than that generated by first heater 24. Furthermore, The temperature sensor 38 is in thermal communication with the ambient temperature block 28, which is a good thermal conductor that will carry away heat generated by the ambient temperature sensor 38. In contrast, the first heater 24 is surrounded with thermal insulation 42 and heat generated by the heater 24 will remain near the heater 24, causing the temperature of the heater 24 to increase. As a result of the rising temperature and the thermal coefficient of resistance, described hereinabove, the resistance $R_h$ of the first heater 24 will increase. However, because the temperature of the temperature sensor 38 remains relatively constant with the ambient temperature of the fluid, its resistance $R_a$ will remain relatively constant.

The increasing resistance $R_h$ of the first heater 24 will cause the voltage $V_2$ to increase while voltage $V_3$ remains relatively constant, thereby decreasing the difference between $V_2$ and $V_3$. The power controller 54 will continue to adjust the value of $V_1$ until the difference between $V_2$ and $V_3$ is zero and the first heater 24 is operating at a temperature $T_h$ above the ambient temperature $T_a$ of the fluid. If the flow sensor 12 is operating at the reference temperature $T_0=T_a$, then the temperature difference between the first heater 24 and the ambient temperature of the fluid may be defined as DT.

When $V_2=V_3$, then $R_h/(R_a+R_3)=R_1/R_2$. At the reference temperature $T_0=T_a$, $R_{h0}(1+\alpha*DT_0)/(R_a+R_3)=R_1/R_2$. That simplifies as:

$$R_{h0}(1+\alpha \cdot DT_0) = \frac{R_1}{R_2}(R_{a0}+R_3)$$

If the ambient temperature now rises an amount ($\delta T$) above the reference temperature then both $R_h$ and $R_a$ will increase in resistance and:

$$\frac{R_{h0}(1+\alpha[DT+\delta T])}{R_{a0}(1+\alpha \cdot \delta T)+R_3} = \frac{R_1}{R_2}.$$

Substituting in the previous equation, that reduces to:

$$DT-DT_0 = \left(\frac{R_1}{R_2} \cdot \frac{R_{a0}}{R_{h0}} - 1\right)\delta T.$$

From that it can be seen that the difference between the temperature $T_h$ of the first heater 24 and the ambient temperature $T_a$ of the fluid can be made constant because the ratio between the resistance values of the first ambient temperature sensor 38 and the first heater 24 are made the same as the ratio between the resistance values $R_1$, $R_2$ of the first and second resistors 56, 58, as expressed:

$R_h/R_a=R_1/R_2$.

In that configuration, the temperature difference between the first heater 24 and the first temperature sensor 38 will be a constant value.

The circuit 50 illustrated in FIG. 3 allows the temperature difference between the first heater 24 and the ambient temperature of the fluid to be held constant. From that circuit 50, one may determine the power supplied to the first heater 24 while maintaining that constant temperature difference. As shown hereinabove, when the temperature difference is held constant, the mass flow rate may be determined from the difference in the power supplied to the first and second heaters 24, 26.

Figure 4:
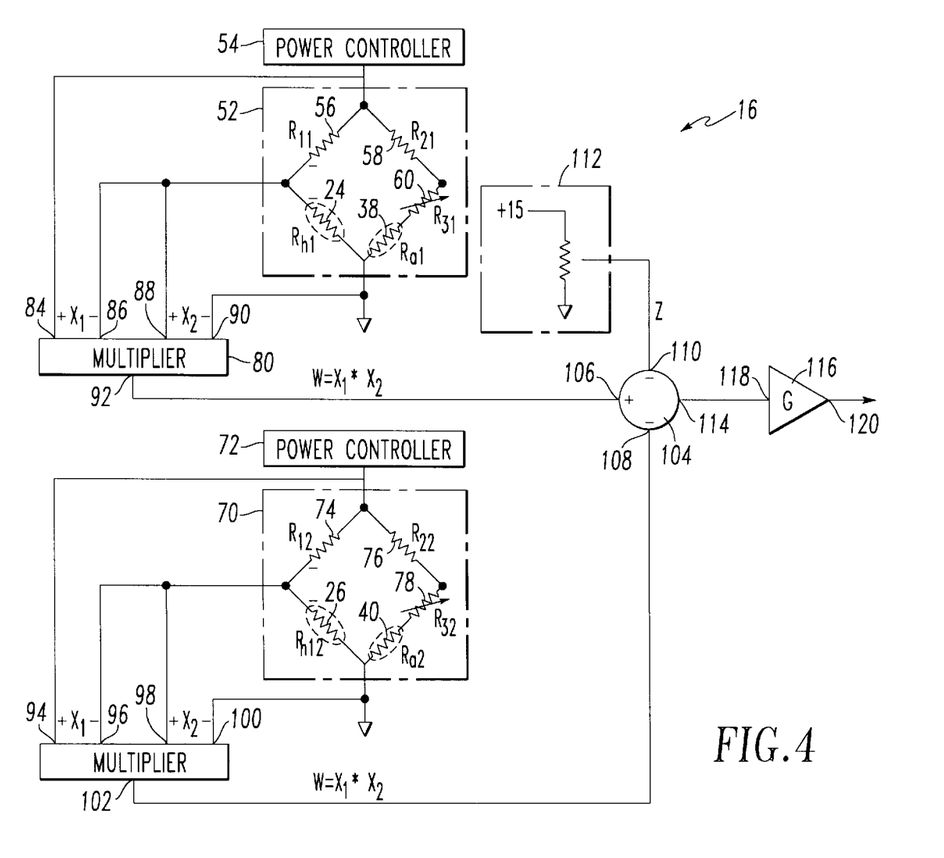
FIG. 4 is a combination circuit schematic and block diagram of a flow meter including analog multiplier integrated circuits and the sensor illustrated in FIG. 2.

FIG. 4 is a combination circuit schematic and block diagram of the flow meter 16 wherein the circuit 14 includes analog multipliers. The circuit 14 includes first and second Wheatstone bridges 52, 70 and first and second power controllers 54, 72. The first Wheatstone bridge 52 includes the first heater 24, the first ambient temperature sensor 38, first and second resistors 56, 58, and a first adjustable resistor 60. The second Wheatstone bridge 70 includes the second heater 26, the second ambient temperature sensor 40, third and fourth resistors 74, 76, and a second adjustable resistor 78.

A first multiplier 80 has first and second input terminals 84, 86 connected across the first resistor 56, and third and fourth input terminals 88, 90 connected across the first heater 24. The first and second input terminals 84, 86 receive signals indicative of a voltage across the first resistor 56 and the third and fourth input terminals 88, 90 receive signals indicative of a voltage across the first heater 24. The first multiplier 80 provides a signal at an output terminal 92 indicative of the product of the voltage across the first resistor 56 and the voltage across the first heater 24.

A second multiplier 82 has first and second input terminals 96, 96 connected across the third resistor 74, and third and fourth input terminals 98, 100 connected across the second heater 26. The first and second input terminals 94, 96 receive signals indicative of a voltage across the third resistor 74, and the third and fourth input terminals 98, 100 receive signals indicative of a voltage across the second heater 26. The second multiplier 82 provides a signal at an output terminal 102 indicative of the product of the voltage across the third resistor 74 and the voltage across the second heater 26.

A summing node 104 has first and second input terminals connected to the output terminals 92, 102 of the first and second multipliers 80, 82, respectively. The summing node 104 may also have a third input terminal 110 connected to a variable signal source 112. The variable signal source 112 may be adjusted to produce a signal that corrects for zero offset errors in the sensor 12. The summing node 104 has an output terminal 114 at which is provided a signal indicative of the signal at the first input terminal 106 minus the signal at the second input terminal 108, minus the signal at the third input terminal 110.

An amplifier 116 may be provided having an input terminal 118 connected to the output terminal 114 of the summing node 104, and an output terminal 120. The gain G of the amplifier 116 may be adjusted to correct for span errors in the determination of the mass flow rate.

The first and second heaters 24, 26 and the first and second ambient temperature sensors 38, 40 may be located in the flow sensor 12, as illustrated in FIG. 2. The remainder of the components illustrated in FIG. 4 may be located in the circuit 14.

Figure 5:
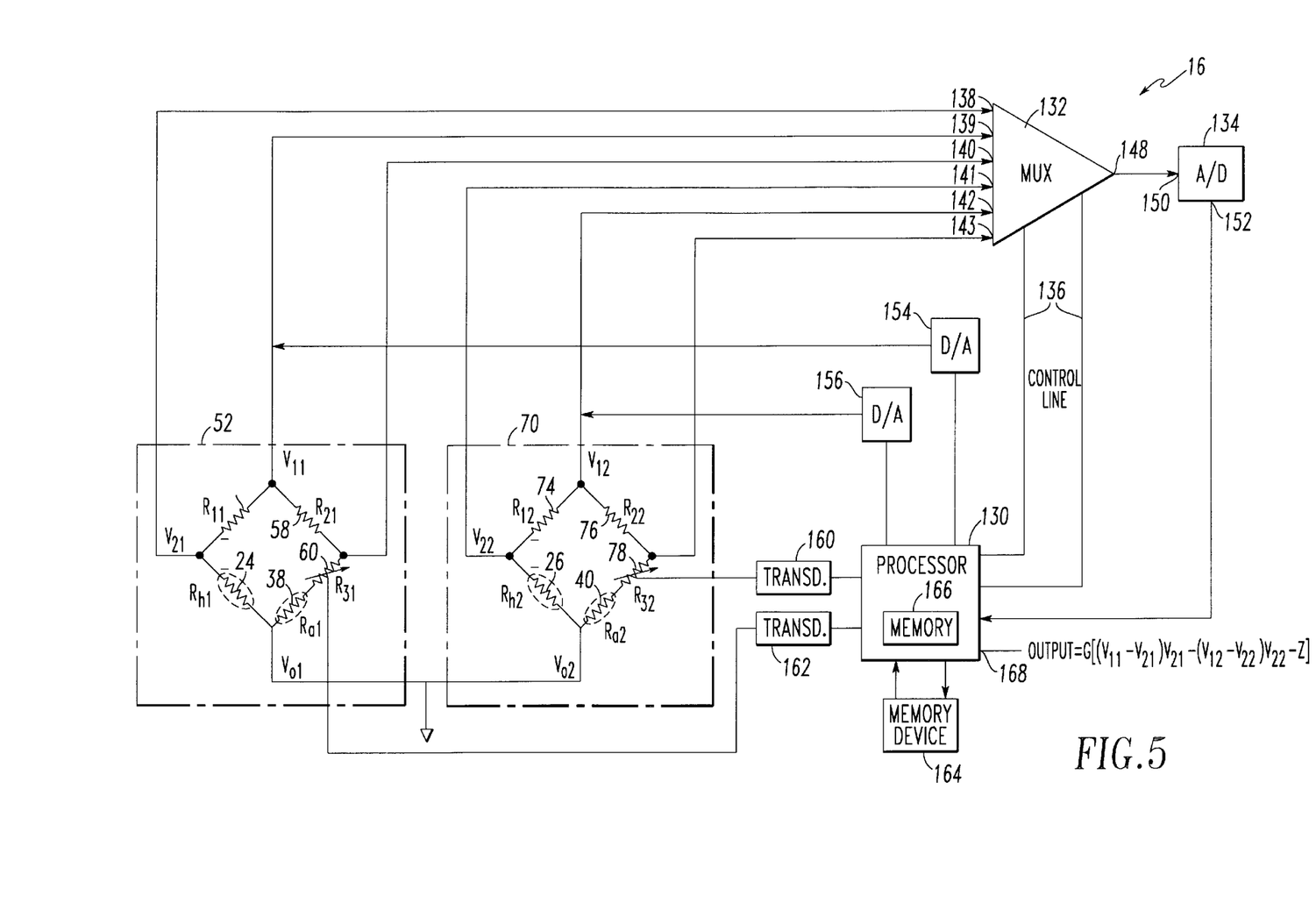
FIG. 5 is combination circuit schematic and block diagram of a flow meter including a processor, two wheatstone bridges, two temperature sensors, and the flow sensor illustrated in FIG. 2.

FIG. 5 is combination circuit schematic and block diagram of the flow meter 16 including the flow sensor 16 illustrated in FIG. 2 and the circuit 14 including first and second Wheatstone bridges 52, 70 and a processor 130.

The processor 130 receives signals from the Wheatstone bridges 52, 70 via a multiplexer 132 and an analog-to-digital converter 134. The processor 130 controls the multiplexer via control lines 136. The processor 130 may be any one of many processors, such as a Pentium® processor manufactured by Intel Corp., Santa Clara, Calif.

The multiplexer 132 has input terminals connected to nodes in the wheatstone bridges 52, 72. A first input terminal 138 is connected between the first resistor 56 and first heater 24, a second input terminal 139 is connected between the first and second resistors 56, 58, a third input terminal 140 is connected between the second resistor 58 and the first adjustable resistor 60, a fourth input terminal 141 is connected between the third resistor 74 and the second heater 26, a fifth input terminal 142 is connected between the third and fourth resistors 74, 76, and a sixth input terminal 143 is connected between the fourth resistor 76 and the second adjustable resistor 78. The multiplexer 132 has an output terminal 148 at which a signal from one of the input terminals 139–143 is selectively provided.

The analog-to-digital converter 134 has an input terminal 150 connected to the output terminal 148 of the multiplexer 132. The analog-to-digital converter 134 receives an analog signal at the input terminal 150 and produces a digital equivalent to that signal at an output terminal 152.

The processor 130 may perform the functions of the power controllers 54, 72 illustrated in FIGS. 3 and 4 by sensing voltages in the wheatstone bridges 52, 70 and selectively providing source voltage to the wheatstone bridges 52, 70 via digital-to-analog converters 154, 156.

First and second transducers 160, 162 may be provided to allow the processor 130 to manipulate the first and second variable resistors 60, 78.

External memory 164 may be provided. The external memory 164 may be read only memory or programmable read only memory. The external memory 164 may also be electronically erasable programmable read only memory, so that it can be written to and erased by the processor 130, and so that it will retain its data if power is removed. The external memory may also include magnetic media, such as floppy disks and hard disks, and optical media, such as optical disks. The processor 130 may also have internal memory 166, such as random access memory and read only memory.

In operation, the processor uses the control line 136 to select a signal from one of the input terminals 138–143 of the multiplexer 132. The selected signal is sent to the processor 130 via the analog-to-digital converter 134. The processor 130 can control the source voltages to the Wheatstone bridges 52, 70 via digital-to-analog converters 154, 156. Furthermore, the processor may control the first and second variable resistors 60, 78 via the first and second transducers 160, 162. Either a proportional integration differential control algorithm or a fuzzy logic algorithm may be used to manipulate the variable resistors 60, 78 and stabilize the Wheatstone bridges 52, 70. Once the Wheatstone bridges 52, 70 are stable, the power supplied to each of the first and second heaters 24, 26 can be calculated by the processor 130 as:

$$P = \frac{(V_1 - V_2) \cdot V_2}{R_1}$$

From those power values the processor 130 can calculate the mass flow rate as:

$$\dot{m} = (P_1 - P_2 - Z)^* G,$$

where $P_1$ is the power to the first heater 24, $P_2$ is the power to the second heater 26, Z is a zero flow calibration correction, and G is the full scale gain factor. A signal indicative of the mass flow rate may be provided at an output terminal 168 of the processor 130.

The first and second heaters 24, 26 and the first and second ambient temperature sensors 38, 40 may be located in the flow sensor 12, as illustrated in FIG. 2. The remainder of the components illustrated in FIG. 5 may be located in the circuit 14.

Figure 6:
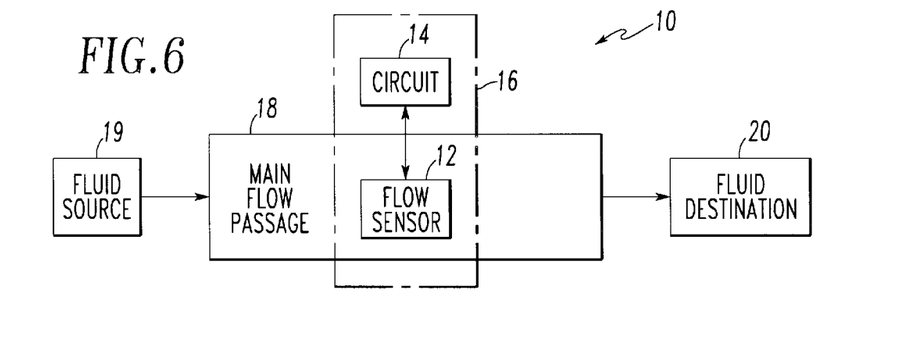
FIG. 6 is a block diagram of a system having a flow sensor in series with a main flow passage.
Figure 7:
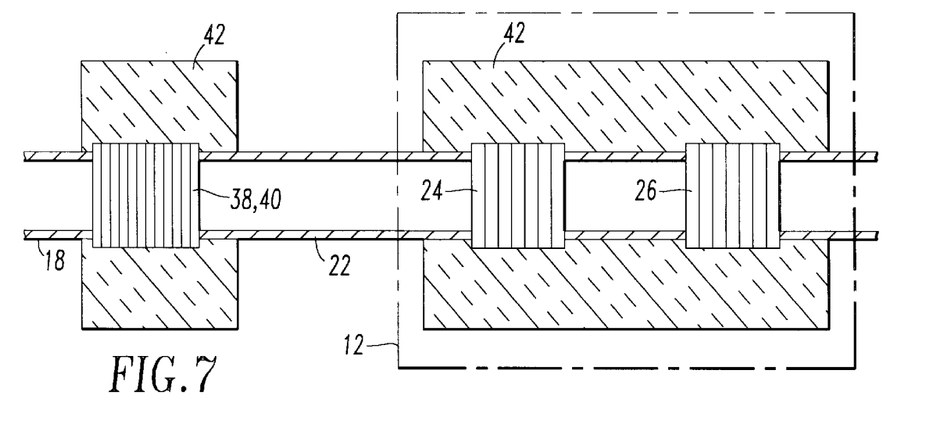
FIG. 7 is a partial cross-sectional view of the flow sensor illustrated in FIG. 6.

FIG. 6 is a block diagram of a fluid flow system 10 having a flow sensor 12 in series with a flow passage 18. FIG. 7 is a partial cross-sectional view of the flow sensor 12 illustrated in FIG. 6. The sensor tube 22 has straight symmetry, and the heaters 24, 26 are disposed symmetrically about the sensor tube 22. The temperature sensors 38, 40 are located at the flow passage 18 and no ambient temperature block is provided. Thermal insulation 42 is provided around the sensor tube 22 and the heaters 24, 26. Thermal insulation 42 is also provided around the temperature sensors 38, 40 to insulate them from the air.

Figure 8:
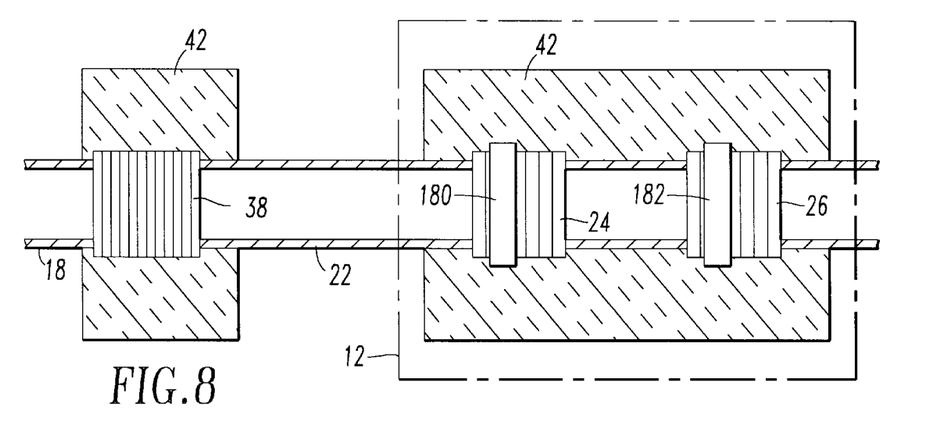
FIG. 8 is a cross-sectional view of a flow sensor including first and second heater temperature sensors and only one fluid temperature sensor.

FIG. 8 is a partial cross-sectional view of a flow sensor 12 including first and second heater temperature sensors and only one ambient fluid temperature sensor 38. The first and second heater temperature sensors 180, 182 may be formed on or around the first and second heaters 24, 26. The sensors 180, 182 may be similar to the ambient fluid temperature sensor 38.

Figure 9:
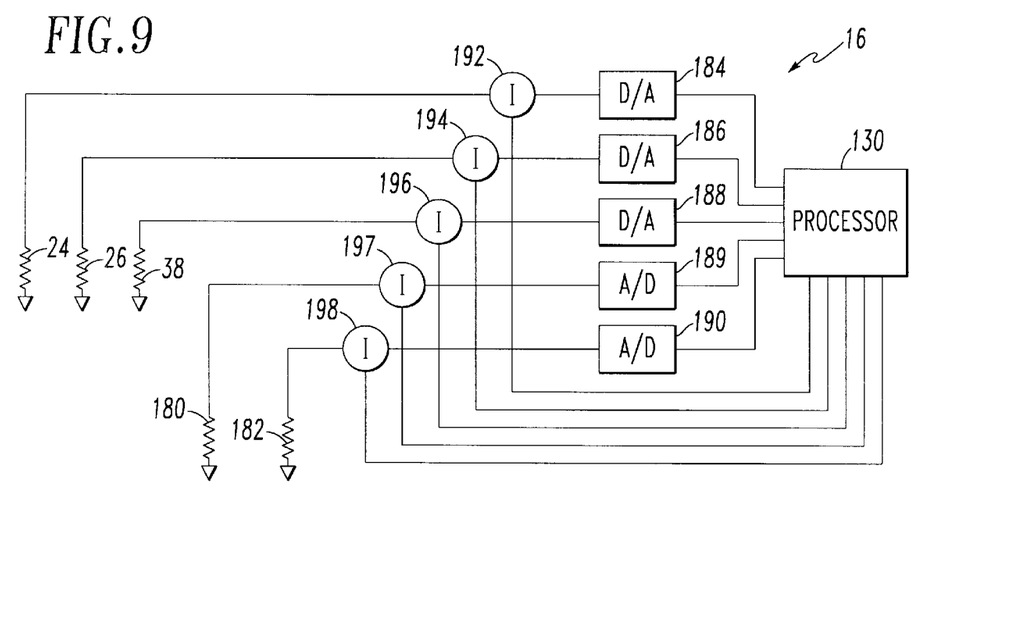
FIG. 9 is a combination circuit schematic and block diagram of the flow meter illustrated in FIG. 8 and including a processor, one temperature sensor, and no Wheatstone bridges.

FIG. 9 is a combination block diagram and circuit schematic of a flow meter 16 including the flow sensor 12 illustrated in FIG. 8. The flow meter 16 includes a processor 130, first and second heaters 24, 26, and an ambient fluid temperature sensor 38. The processor 130 may control the voltage to the heaters 24, 26 via digital-to-analog converters 184, 186. The processor 130 receives data indicative of the ambient temperature of the fluid from the sensor 38. The first and second heater temperature sensors 180, 182 provide signals indicative of the temperature of the first and second heaters 24, 26, respectively. The processor 130 may receive signals from the sensor 38 and the first and second heater temperature sensors 180, 182 via analog-to-digital converters 188, 189, 190. The meter may be implemented without knowing the temperature coefficient of resistance of the first and second heaters 24, 26, or with first and second heaters 24, 26 that do not have a useful temperature coefficient of resistance, because the temperature of the first and second heaters 24, 26 may be monitored by the first and second heater temperature sensors 180, 182.

In operation, the processor 130 monitors the temperature of the first and second heaters 24, 26 and the ambient temperature of the fluid. The voltage to the heaters 24, 26 is adjusted so that the heaters 24, 26 are both maintained at a temperature that is a constant temperature difference greater than the ambient fluid temperature. Power to the heaters 24, 26 may be determined, for example, from the current and voltage applied to the heaters 24, 26. Current to the heaters 24, 26 may be determined, for example, from current sensors 192, 194.

The ambient fluid temperature sensor 38, first heater temperature sensor 180, and second heater temperature sensor 182 may be formed from resistive wires wherein the resistances of the sensors 38, 180, 182 are indicative of the temperature of the sensors 38, 180, 182. Resistance may be determined, for example, with the equation R=V/I after applying a known voltage and determining current. Current may be determined, for example, from current sensors 196, 197, 198 in series with the temperature sensors 38, 180, 182. In the embodiment illustrated in FIGS. 8 and 9, only one ambient fluid temperature sensor 38 is used, although the present invention may utilize more than one ambient fluid temperature sensor 38.

The meter 16 illustrated in FIG. 9 may be implemented without the first and second heater temperature sensors 180, 182, without the current sensors 197, 198, and without the analog-to-digital converters 189, 190. For example, if the first and second heaters 24, 26 have a known temperature coefficient of resistance, the temperature of the first and second heaters 24, 26 may be determined from the resistance of the heaters, which may be determined from the current measured by current sensors 192, 194 and a known voltage applied by the processor 130.

Figure 10:
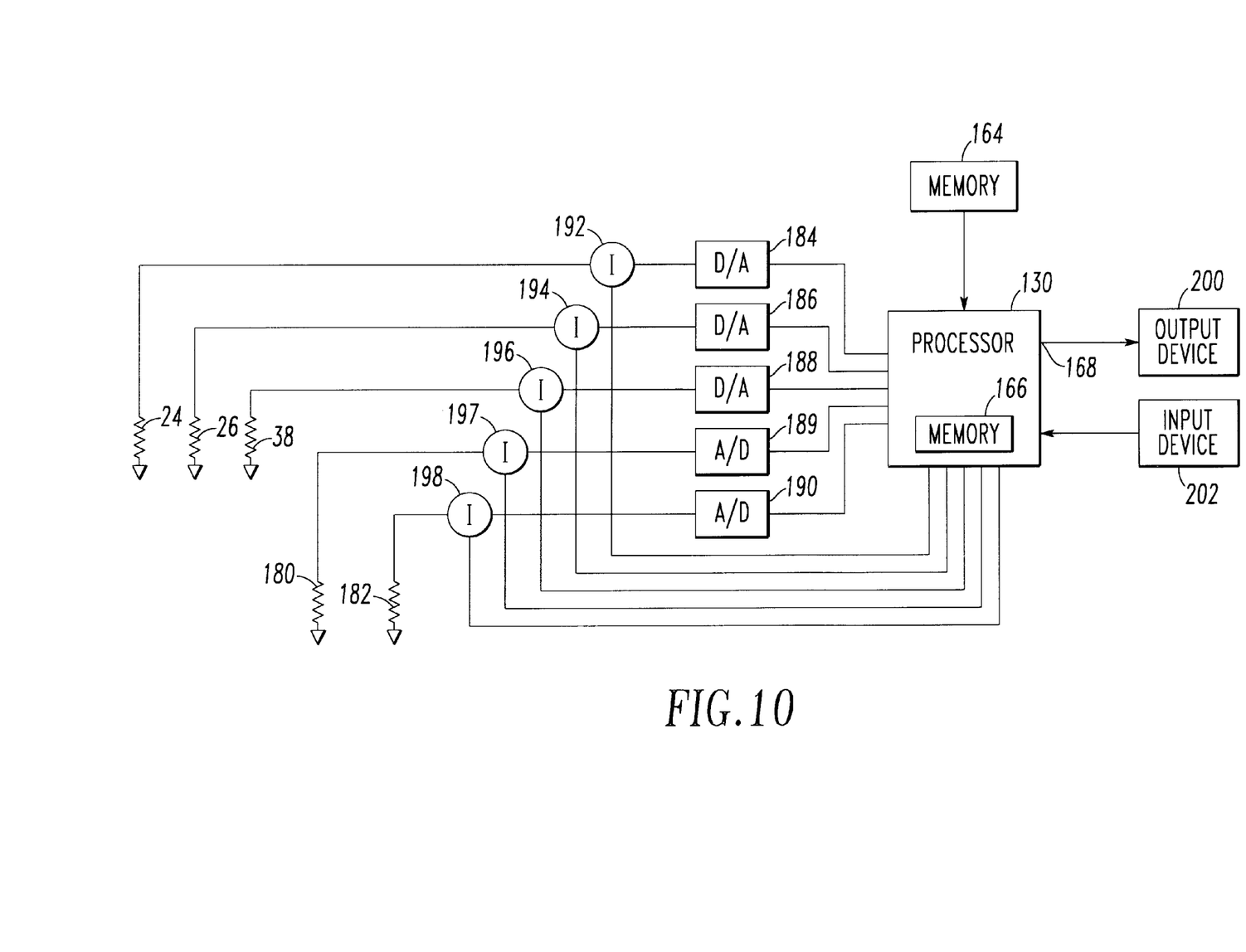
FIG. 10 is a combination circuit schematic and block diagram of a flow meter including a processor, an output device and an input device.

FIG. 10 is a combination circuit schematic and block diagram of a flow meter 16 including a processor 130, an output device 200, and an input device 202. The output device 200 may be, for example, a video monitor, and the input device 202 may be, for example, a keyboard. The memory devices 164, 166 are computer-readable medium and may have stored thereon instructions which, when executed by the processor 130, cause the processor 130 to operate a flow sensor 12, circuit 14, and/or flow meter 16 in accordance with the present invention. The processor 130, one or more of the memory devices 164, 166, the output device, and the input device may be considered a computer system for measuring a fluid according to the present invention. Of course, more or less components may also be a computer system for measuring a fluid according to the present invention.

Figure 11:
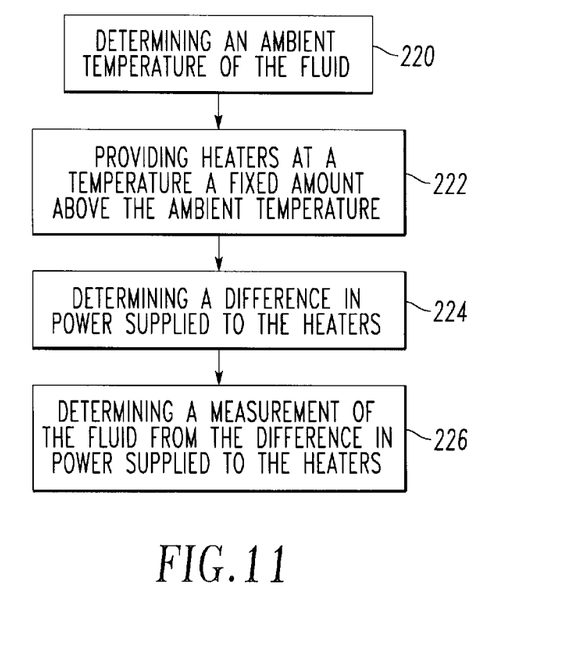
FIG. 11 is a flow chart illustrating a method of measuring a fluid in accordance with the present invention.

FIG. 11 is a flow chart illustrating a method of measuring a fluid in accordance with the present invention. That measurement may be, for example, mass flow rate or mass flow. Step 200 of the method includes determining the temperature of the fluid. Step 202 includes providing first and second heaters 24, 26 at a temperature a fixed amount above the temperature of the fluid. Step 204 includes determining a difference in power supplied to the first and second heaters 24, 26. Step 206 includes determining the measurement of the fluid from the difference in power supplied to the first and second heaters. That determination may be mass flow rate and mass flow, as described hereinabove. The method may be stored on a computer-readable medium, such as the external memory 164 and the internal memory 166, may be computer-implemented, and may be executed by the processor 130.

Those of ordinary skill in the art will recognize that many modifications and variations of the present invention may be implemented. For example, the multiplexer and analog to digital converter are illustrated in FIG. 5 as separate components, but may be integrated on the same component. Also, analog-to-digital converters may be integrated into the processor illustrated in FIG. 5. Many other modification and variations are also possible. The foregoing description and the following claims are intended to cover all such modifications and variations. Furthermore, the materials and processes disclosed all illustrative of the invention, but are not exhaustive. Other materials and processes may also be used to utilize the present invention.

We claim:

1. A flow meter for measuring a fluid having a temperature, comprising:
   a flow sensor including a sensor tube, a first heater disposed at said sensor tube, a second heater disposed at said sensor tube, and a first temperature sensor in thermal communication with the fluid; and
   a circuit for selectively applying power to said first and second heaters to provide said first and second heaters at a temperature a fixed amount above the temperature of the fluid, and for determining a difference in power supplied to said first and second heaters, wherein the power supplied to said first and second heaters is determined from a product of a voltage and a current supplied to each of said first and second heaters.

2. The meter of claim 1, wherein said sensor tube is connected in parallel to a main flow passage.

3. The meter of claim 1, wherein said sensor tube is connected in series with a main flow passage.

4. The meter of claim 1, wherein said sensor tube is "U"-shaped.

5. The meter of claim 1, wherein said sensor tube is straight.

6. The meter of claim 1, wherein said first and second heaters are disposed outside of said sensor tube.

7. The meter of claim 6, wherein said first and second heaters are wires around said sensor tube.

8. The meter of claim 1, wherein said first and second heaters are within said sensor tube.

9. The meter of claim 1, wherein said first and second heaters are thin film elements.

10. The meter of claim 1, wherein said first temperature sensor is selected from a group comprising wire, thermocouples, resistor temperature devices, and thermistors.

11. The meter of claim 1, wherein said first temperature sensor is in thermal communication with the fluid via an ambient temperature block.

12. The meter of claim 11, wherein said ambient temperature block is in thermal communication with a portion of said sensor tube upstream of said first and second heaters, and wherein said ambient temperature block is in thermal communication with a portion of said sensor tube downstream from said first and second heaters.

13. The meter of claim 1, further comprising a thermal insulator surrounding said sensor tube.

14. The meter of claim 13, wherein said thermal insulator is closed cell foam.

15. The meter of claim 1, further comprising:
a first heater temperature sensor in thermal communication with said first heater; and
a second heater temperature sensor in thermal communication with said second heater.

16. The meter of claim 15, wherein said first and second heater temperature sensors are selected from a group comprising wire, thermocouples, resistor temperature devices, and thermistors.

17. The meter of claim 1, wherein said flow sensor includes a second temperature sensor in thermal communication with the fluid.

18. The meter of claim 17, wherein said circuit includes:
a first wheatstone bridge including a first resistor in series with said first heater and a second resistor in series with a first adjustable resistor in series with said first temperature sensor; and
a second wheatstone bridge including a third resistor in series with said second heater and a fourth resistor in series with a second adjustable resistor in series with said second temperature sensor.

19. The meter of claim 18, further comprising:
a first power controller connected to said first wheatstone bridge; and
a second power controller connected to said second wheatstone bridge.

20. The meter of claim 19, wherein said circuit includes a first multiplier having first and second input terminals connected across said first resistor, third and fourth input terminals connected across said first heater, and an output terminal;
a second multiplier having a first and second input terminals connected across said third resistor, third and fourth input terminals connected across said second heater, and an output terminal; and
a summing mode having a first input terminal connected to said output terminal of said first multiplier, a second input terminal connected to said output terminal of said second multiplier, and an output terminal.

21. The meter of claim 20, wherein said summing node produces an output signal at said output terminal indicative of a signal at said first input terminal minus a signal at said second input terminal.

22. The meter of claim 20, further comprising a variable signal source, and wherein said summing node includes a third input terminal connected to said variable signal source.

23. The meter of claim 22, wherein said summing node produces an output signal at said output terminal indicative of a signal at said first input terminal minus a signal at said second input terminal minus a signal at said third input signal.

24. The meter of claim 20, further comprising an amplifier having an input terminal connected to said output terminal of said summing node, and having an output terminal.

25. The meter of claim 18, wherein said circuit includes a processor connected to said first and second wheatstone bridges.

26. The meter of claim 25, wherein said processor has an output terminal and procedures a signal at said output terminal indicative of the fluid.

27. The meter of claim 25, wherein:
said processor is connected to a node between said first and second resistors in said first wheatstone bridge via a first digital-to-analog converter; and
said processor is connected to a node between said third and fourth resistors in said second wheatstone bridge via a second digital-to-analog converter.

28. The meter of claim 27, wherein:
said processor is connected to said first variable resistor in said first wheatstone bridge via a third digital-to-analog converter; and
said processor is connected to said second variable resistor in said second wheatstone bridge via a fourth digital-to-analog converter.

29. The meter of claim 25, further comprising a multiplexer having:
a first input terminal connected to a first node between said first and second resistors;
a second input terminal connected to a second node between said first resistor and said first heater;
a third input terminal connected to a third node between said second resistor and said first variable resistor;
a fourth input terminal connected to a fourth node between said third and fourth resistors;
a fifth input terminal connected to a fifth node between said third resistor and said second heater; and
a sixth input terminal connected to a sixth node between said fourth resistor and said second variable resistor; and
an output terminal connected to said processor.

30. The meter of claim 29, wherein said output terminal of said multiplexer is connected to said processor via a analog-to-digital converter.

31. The meter of claim 29, wherein said multiplexer includes a control input terminal connected to said processor.

32. The meter of claim 1, wherein said circuit includes a processor connected to said first and second heaters and connected to said first temperature sensor.

33. The meter of claim 32, wherein said processor is connected to said first and second heaters and said first temperature sensor via current sensors.

34. The meter of claim 32, wherein said processor is connected to said first and second heaters and said first temperature sensor via digital-to-analog converters.

35. The meter of claim 32, wherein said sensor includes a first heater temperature sensor in thermal communication with said first heater, a second heater temperature sensor in communication with said second heater, and wherein said processor is connected to said first and second heater temperature sensors.

36. The meter of claim 35, wherein said processor is connected to said first and second heater temperature sensors via current sensors.

37. The meter of claim 35, wherein said processor is connected to said first and second heater temperature sensors via digital-to-analog converters.

38. The meter of claim 1, wherein:
the current supplied to said first heater is determined from a quotient of a voltage supplied to a first resistor connected in series with said first heater and a resistance of said first resistor; and
the current supplied to said second heater is determined from a quotient of a voltage supplied to a second resistor is series with said second heater and a resistance of said second resistor.

39. The meter of claim 1, wherein the current supplied to said first heater is determined by a first current sensor connected in series with said first heater and wherein the current supplied to said second heater is determined by a second current sensor connected is series with said second heater.

40. A method of measuring a fluid having a temperature, comprising:
determining the temperature of the fluid;
providing first and second heaters at a temperature a fixed amount above the temperature;
determining a difference in power supplied to the first and second heaters, wherein determining the power supplied to each of the first and second heater includes determining a product of a current and a voltage supplied to each of the first and second heaters; and
determining a measurement of the fluid from the difference in power supplied to the first and second heaters.

41. The method of claim 40, wherein determining a measurement includes determining mass flow rate of the fluid, and determining the measurement includes determining a product of a constant and the difference in power supplied to the first and second heaters.

42. The method of claim 40, wherein the determining a measurement includes determining mass flow of the fluid, and determining the measurement includes determining a product of an elapsed time, a constant, and the difference in power supplied to the first and second heaters.

43. The method of claim 40, wherein determining a measurement includes considering a gain factor.

44. The method of claim 43, wherein considering the gain factor includes determining a constant pressure specific heat of the fluid multiplied by a difference between the temperature of one of the first and second heaters and the temperature of the fluid.

45. The method of claim 40, wherein determining a measurement includes considering a zero flow calibration factor.

46. The method of claim 40, wherein determining a current supplied to each of the first and second heaters includes:
determining the current supplied to the first heater from a quotient of a voltage supplied to a first resistor in series with the first heater and a resistance of the first resistor, and
determining the current supplied to the second heater and a resistance of the second resistor.

47. The method of claim 40, wherein determining a current supplied to each of the first and second heaters includes directly determining the current supplied to each of the first and second heaters.

48. The method of claim 47, wherein directly determining a current supplied to each of the first and second heaters includes determining the current supplied to the first heater with a first current sensor connected in series with the first heater and determining the current supplied to the second heater with a second current sensor connected in series with the second heater.

* * * * *